(12) United States Patent
Liao

(10) Patent No.: US 6,526,732 B2
(45) Date of Patent: Mar. 4, 2003

(54) END SEALING DEVICE OF PACKAGING SYSTEM

(75) Inventor: Jonathan I. N. Liao, Taipei (TW)

(73) Assignee: Benison & Co., Ltd., Taipei (TW)

(*) Notice: Subject to any disclaimer, the term of this patent is extended or adjusted under 35 U.S.C. 154(b) by 99 days.

(21) Appl. No.: 09/859,383

(22) Filed: May 18, 2001

(65) Prior Publication Data

US 2002/0170269 A1 Nov. 21, 2002

(51) Int. Cl.$^7$ ................................................. B65B 9/06
(52) U.S. Cl. ........................ 53/550; 53/374.6; 53/371.6; 74/405; 74/422
(58) Field of Search .............................. 53/374.5, 374.6, 53/371.5, 371.6, 550; 74/422, 405

(56) References Cited

U.S. PATENT DOCUMENTS

| | | | | |
|---|---|---|---|---|
| 3,762,242 A | * | 10/1973 | Swezey | 74/822 |
| 4,553,377 A | * | 11/1985 | Klinkel | 53/550 |
| 5,271,210 A | * | 12/1993 | Tolson | 53/550 |
| 5,475,964 A | * | 12/1995 | Fiesser et al. | 53/374.6 |
| 5,653,085 A | * | 8/1997 | Suga | 53/374.5 |
| 5,904,027 A | * | 5/1999 | Bonde | 53/374.6 |
| 5,941,052 A | * | 8/1999 | Evangelisti | 53/371.6 |
| 6,050,065 A | * | 4/2000 | Bonde | 53/374.6 |
| 6,178,719 B1 | * | 1/2001 | Hansen | 53/374.6 |

* cited by examiner

Primary Examiner—John Sipos
Assistant Examiner—Thanh Truong
(74) Attorney, Agent, or Firm—Rosenberg, Klein & Lee (57) ABSTRACT

A packaging system includes a conveyor belt having a carrying surface for carrying an article to be packaged by a package film and an end sealing device including spaced upper and lower sealing blocks between which the article passes. A recessed chamber is formed in the carrying surface by extending the conveyor belt around specially arranged rollers. The end sealing device includes a machine frame slidably supported on rails. A driving system includes a motor and a reciprocating mechanism having an adjustable stroke coupling the machine frame to the motor. The rollers of the recessed chamber are attached to the machine frame to be movable therewith. The upper and lower sealing blocks are movably supported on the machine frame by upright posts with the lower sealing block accommodated in the chamber of the conveyor. Racks extend from the upper and lower sealing blocks with a toothed wheel matingly interposed therebetween for mechanically coupling the sealing blocks together. Driving devices, such as pneumatic cylinders, are provided to selectively drive the sealing blocks toward each other for performing sealing operation on the article. The racks are selectively disengageable from the toothed wheel to decouple the sealing blocks from each other thereby allowing adjustment of the distance between the sealing blocks for accommodating articles of different sizes.

20 Claims, 10 Drawing Sheets

END SEALING DEVICE OF PACKAGING SYSTEM

FIELD OF THE INVENTION

The present invention generally relates to a packaging system with heat sealing device for packaging articles with heat sealing film, and in particular to a sealing device capable to heat-seal leading and tailing ends of articles of different sizes.

BACKGROUND OF THE INVENTION

Package films made of plastics or other heat sealable materials are widely used in packaging a variety of products, such as foods, compact disks for computer software and music and books, to protect the products from being damaged or contaminated. In a packaging process, a package film is placed around an article to be packaged. Edges of the package film are then heated to seal along sides of the article. Thus, an important factor that influences the productivity of a packaging line is the heat sealing operation performed by a packaging system.

Figure 10:
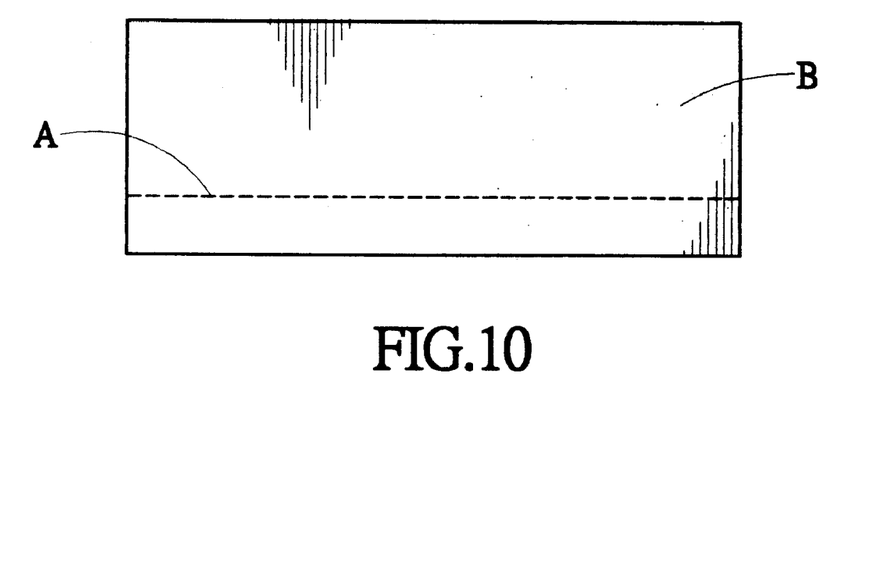
FIGS. 10 and 11 are schematic views showing sealing lines formed by a conventional packaging machine located below and above middle line of the thickness of an article.
Figure 11:
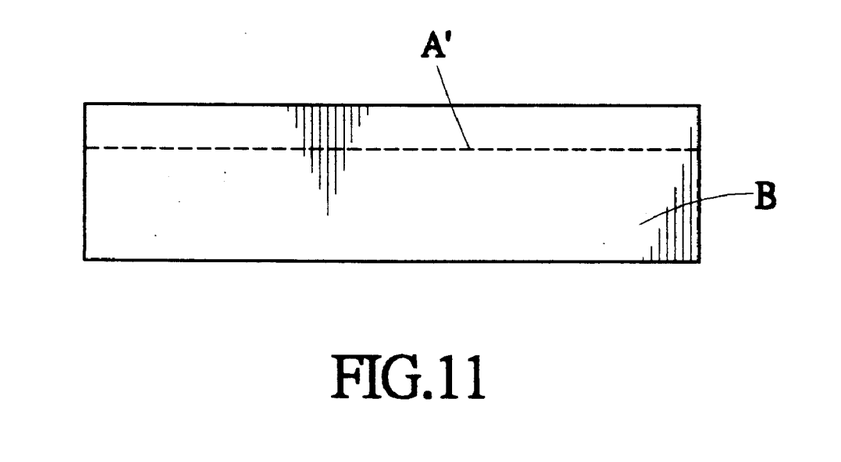

A conventional packaging system forms an L-shaped sealing line along two adjacent sides of an article to be packaged. In other words, it seals two sides simultaneously. However, the operation of the packaging system is intermittent for the packaging device must be idle when articles to be packaged are being conveyed to the packaging system. The productivity is thus limited. Furthermore, articles to be packaged may have variable sizes and shapes. This causes deficiency in final package made by the conventional packaging system. For example, as shown in FIGS. 10 and 11, due to different thickness (dimension in a vertical direction) of the articles to be packaged, a sealing line A or A' may no be located midway of the thickness of an article B. It may be below (sealing line A) or above (sealing line A') the middle line. Such a situation causes certain problems. For example, the sealing line may not be properly formed or the package film be damaged or undesired over-packaging be caused. Eventually, the quality of the products is negatively affected.

It is desired to have a packaging system which can accommodate different sizes of articles to be packaged and providing a continuous packaging line for enhancing productivity thereof

SUMMARY OF THE INVENTION

Accordingly, an object of the present invention is to provide a packaging system comprising a device for sealing leading and tailing ends of articles of different thickness.

Another object of the present invention is to provide a packaging system comprising an end sealing device capable to move with respect to an article conveyor for continuously packaging articles carried by the conveyor and thus enhancing packaging efficiency.

A further object of the present invention is to provide a packaging machine comprising an end sealing device for forming a sealing line without causing damage to the package film.

A still further object of the present invention is to provide a packaging system capable to form sealing line without causing damage to the package itself and articles packaged thereby.

To achieve the above objects, in accordance with the present invention, there is provided a packaging system comprising a conveyor belt having a carrying surface for carrying an article to be packaged by a package film and an end sealing device including spaced upper and lower sealing blocks between which the article passes. A recessed chamber is formed in the carrying surface by extending the conveyor belt around specially arranged rollers. The end sealing device includes a machine frame slidably supported on rails. A driving system includes a motor and a reciprocating mechanism having an adjustable stroke coupling the machine frame to the motor. The rollers of the recessed chamber are attached to the machine frame to be movable therewith. The upper and lower sealing blocks are movably supported on the machine frame by upright posts with the lower sealing block accommodated in the chamber of the conveyor. Racks extend from the upper and lower sealing blocks with a toothed wheel matingly interposed therebetween for mechanically coupling the sealing blocks together. Driving devices, such as pneumatic cylinders, are provided to selectively drive the sealing blocks toward each other for performing sealing operation on the article. The racks are selectively disengageable from the toothed wheel to decouple the sealing blocks from each other thereby allowing adjustment of the distance between the sealing blocks for accommodating articles of different sizes.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
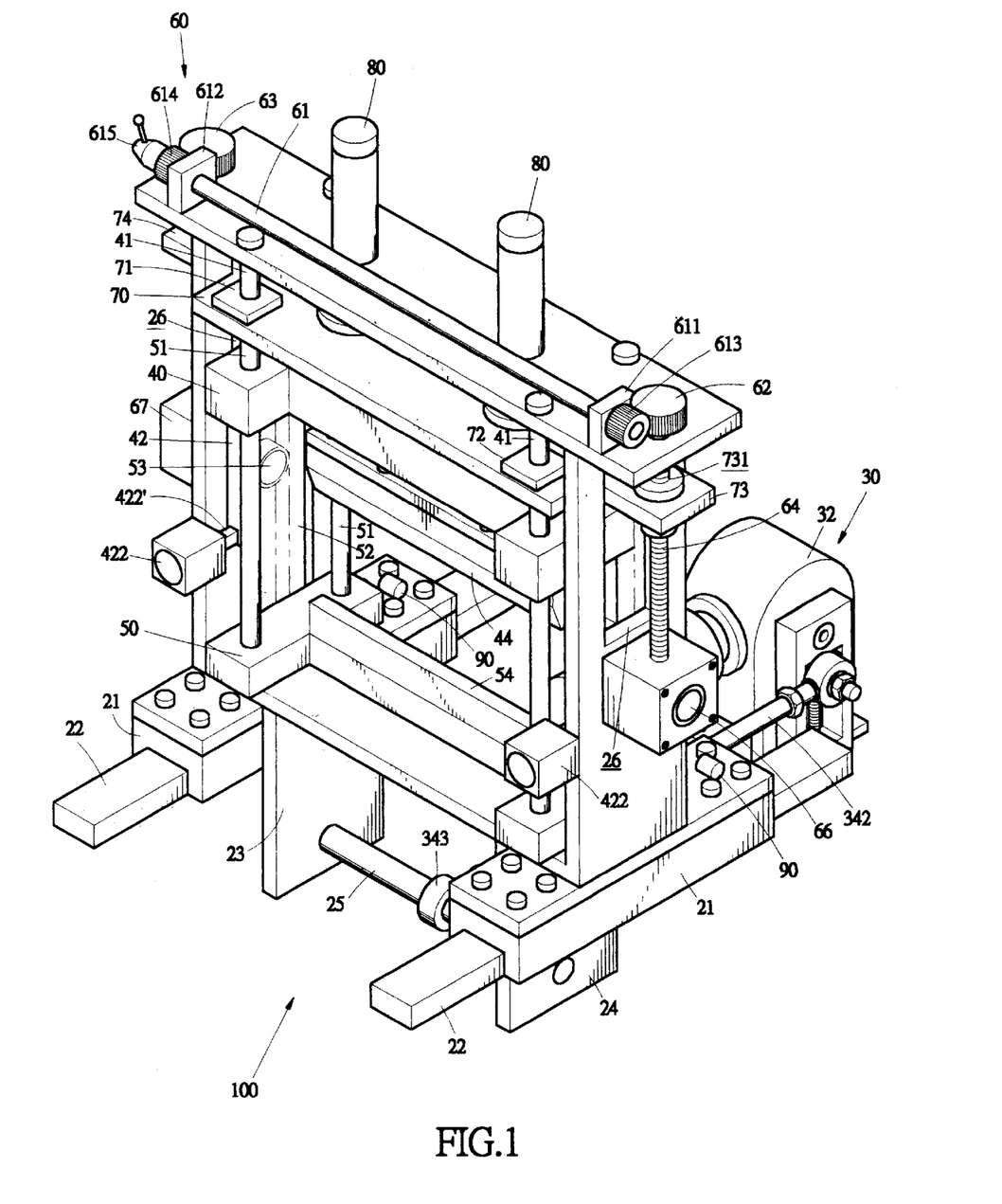
FIG. 1 is a perspective view of an end sealing device of a packaging system constructed in accordance with the present invention.
Figure 2:
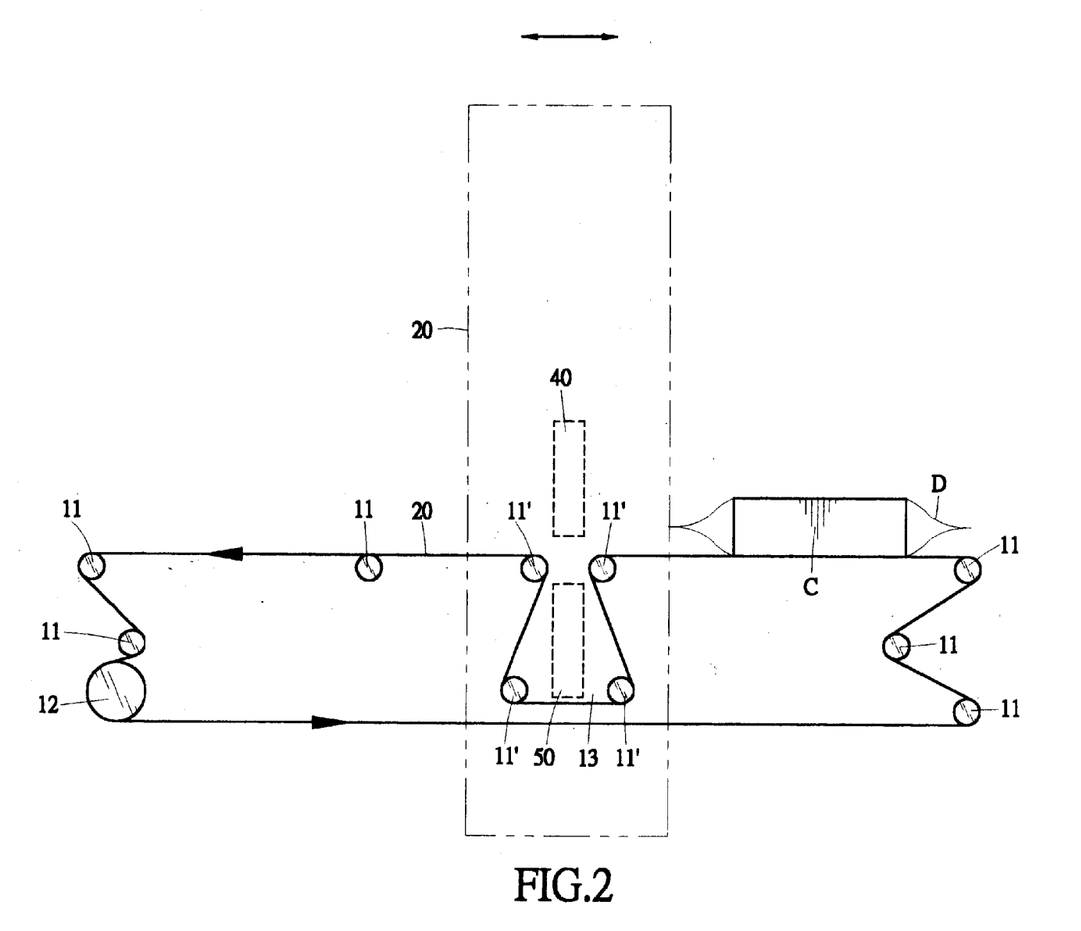
FIG. 2 is a schematic view of the packaging system of the present invention with only a portion of the end sealing device shown therein.

With reference to the drawings and in particular to FIG. 2, a packaging system in accordance with the present invention is shown. The packaging system comprises a conveyor belt 10 for carrying and moving, in a forwarding direction, an article C to be packaged together with a package film D through an end sealing device, generally designated with reference numeral 100 and particularly shown in FIG. 1. The packaging system comprises a plurality of rollers 11 for movably supporting the conveyor belt 10 and a belt driving device 12, such as an electrical motor, for driving the conveyor belt 10. Four additional rollers 11', which will be referred to as movable rollers hereinafter for distinction, are arranged in such a way that a recessed chamber 13 is formed on a carrying surface of the belt 10 by extending the belt 10 around the movable rollers 11'. Such an arrangement allows the chamber 13 to be movable with respect to the conveyor belt 10 when the movable rollers 11' are moved with respect to the belt 10 in or opposite to the forwarding direction of the conveyor belt 10.

The end sealing device 100 of the present invention comprises a machine frame 20 to which the movable rollers 11' are fixed. The relative position between the end sealing device 100 and the conveyor belt 10 can be adjusted. This will be further described. The end sealing device 100 further comprises film sealing means (not labeled) comprising upper and lower sealing blocks 40, 50 which are spaced from each other to allow the article C and the package film D to pass therebetween. The sealing blocks 40, 50 are allowed to move with respect to each other for engaging and carrying out heat sealing operation on the package film D on leading and tailing ends of the article C. The lower sealing block 50 is arranged in the chamber 13 thereby aligning the space between the upper and lower sealing blocks 40, 50 to the article C carried by the conveyor belt 10.

Figure 7:
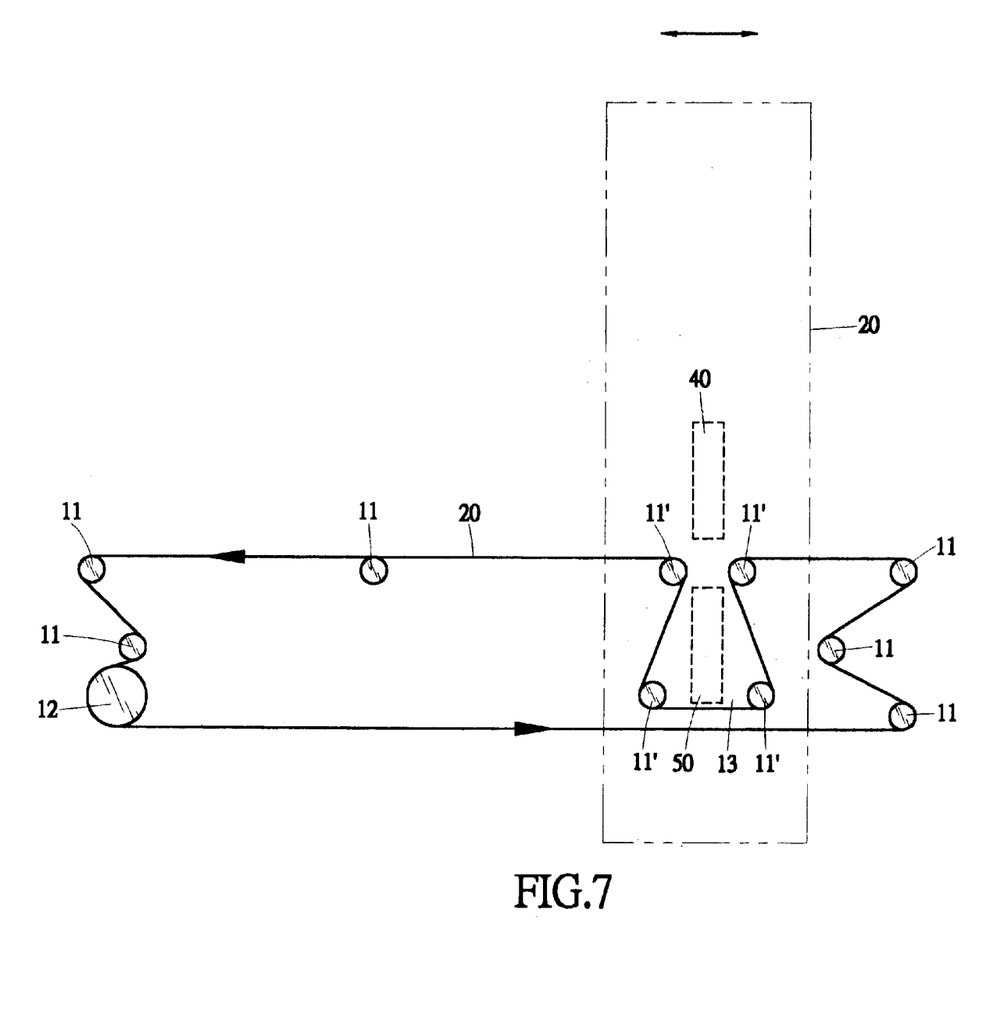
FIG. 7 is similar to FIG. 2 showing the movement of the end sealing device with respect to a conveyor belt.

Also referring to FIG. 1, the machine frame 20 comprises a pair of slide blocks 21 movably supported on a pair of spaced guide rails 22 thereby allowing the machine frame 20 to be movable along the guide rails 22, as indicated by arrow shown in FIGS. 2 and 7. The guide rails 22 can be of any suitable form or any known means and can be integrated with other packaging system or packaging line or assembly line for forming an integrated, continuous production line. The machine frame 20 comprises two lower plates 23, 24 spaced from each other and a cylindrical cross bar 25 fixed to and extending between the lower plates 23, 24. Two upper plates (not labeled) extend from the machine frame 20 and each defines a slot 26.

Figure 3:
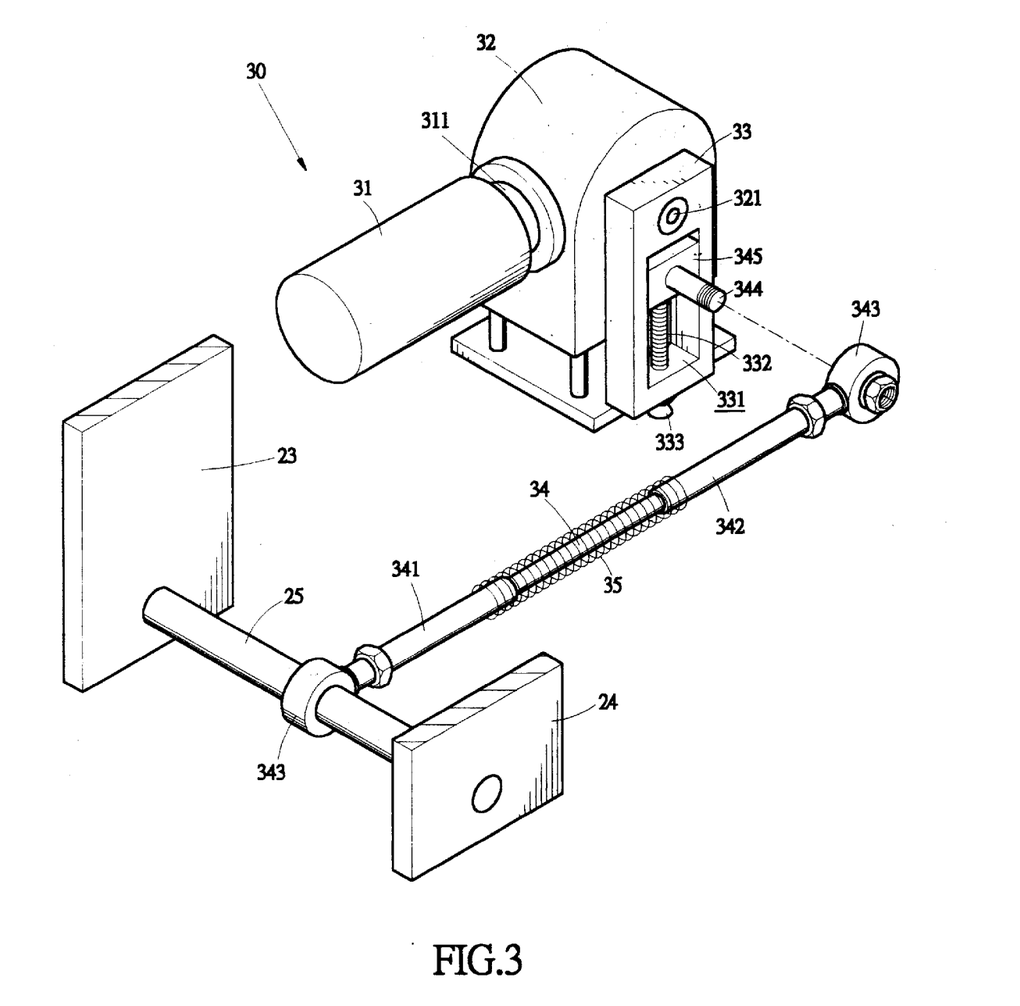
FIG. 3 is an exploded view of a driving system of the end sealing device of the present invention.

Also referring to FIG. 3, a driving system 30 comprises a motor 31 and a driving link 34 mechanically coupled between the cross bar 25 and the motor 31. The motor 31 comprises an output spindle 31 coupled to a speed reduction device 32 which can be any known speed reduction device. An eccentric member 33 is attached to an output shaft 321 of the speed reduction device 32 in an eccentric way whereby the eccentric member 33 is rotatable about the output shaft 321. The eccentric member 33 defines a slot 331 extending in a radial direction with respect to the output shaft 321 of the speed reduction device 32. A movable block 345 is movably received in the slot 331. A screw rod 332 having a hand operation end 333 is rotatably supported by the eccentric member 33 and threadingly engages the movable block 345 for moving the block 345 in the slot 331 in a radial direction with respect to the output shaft 321 thereby changing eccentricity of the block 345 with respect to the output shaft 321.

A shaft 344 extends from the movable block 345. Preferably, the shaft 44 forms a threaded end (not labeled). The driving link 34 has two ends over which two arms 341, 342 are fit. If desired, cushioning means may be provided on the driving link 34. For example, the arms 341, 342 may be tubular members telescopically fit over the ends of the driving link 34 with a spring 35 arranged therebetween.

Alternatively and additionally, hydraulic or pneumatic means may be formed between the arms 341, 342 and the driving link 34 for absorption of shock and vibration during operation. However, the arms 341, 342 may be directly mounted to the ends of the link 34 without the cushioning means. The arm 341 comprises a ring 343 rotatably fit over the cross bar 25. The arm 342 forms a similar ring 343 rotatably fit over the shaft 344 and is prevented from axial movement by a nut (not labeled) or similar device engaging the threaded end of the shaft 344. Preferably, bearing means (not shown) is arranged in the rings 343 for supporting relative rotation of the rings 343 with respect to the cross bar 25 and the shaft 344.

Due to the eccentricity of the movable block 345, and thus the shaft 344, with respect to the output shaft 321 of the speed reduction device 32, rotation of the output shaft 321 causes the cross bar 25 and thus the machine frame 20 to reciprocate. The stroke of the reciprocation of the machine frame 20 is determined by the distance between the shaft 344 of the movable block 345 and the output shaft 321 of the speed reduction device 32. The reciprocation of the machine frame 20 allows the end sealing device 100 of the present invention to alternately seal leading and tailing ends of an article.

Figure 4:
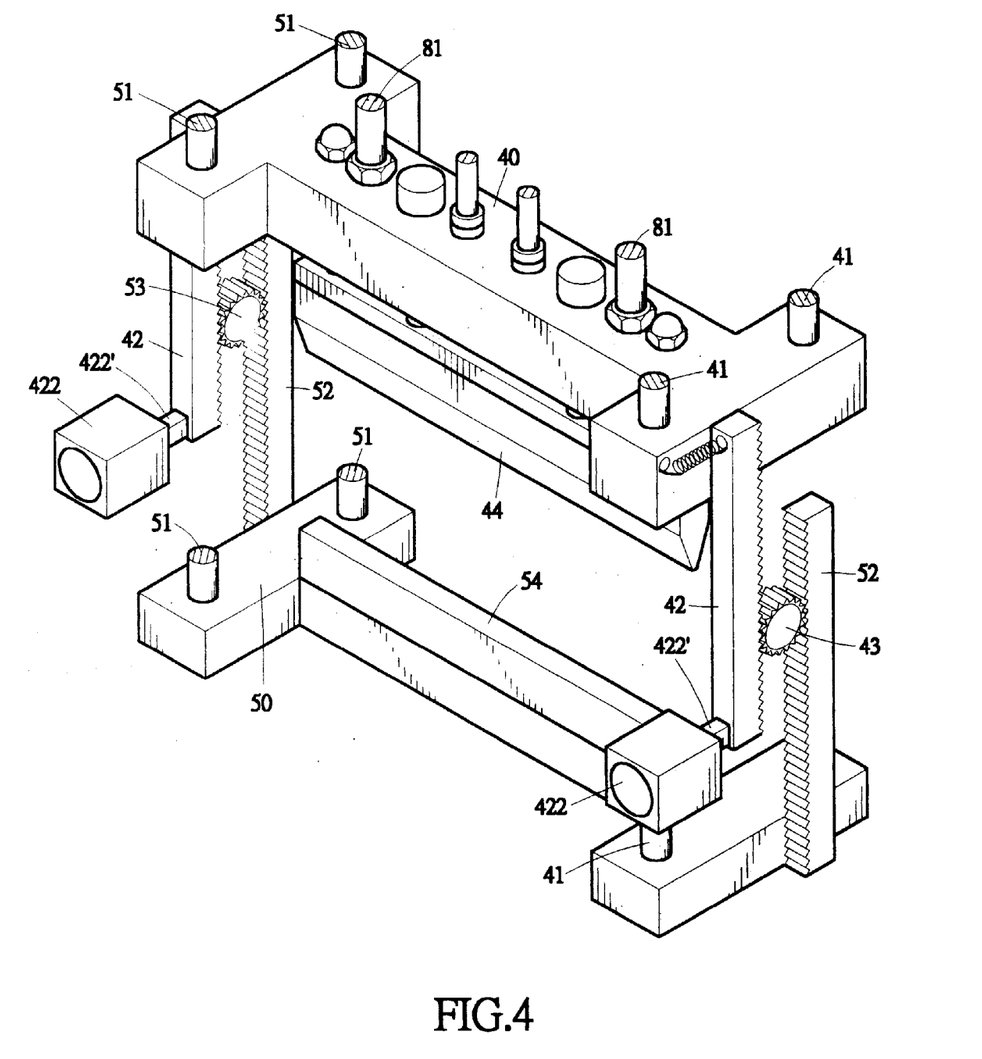
FIG. 4 is a perspective view of upper and lower sealing blocks of the end sealing device of the present invention.
Figure 5:
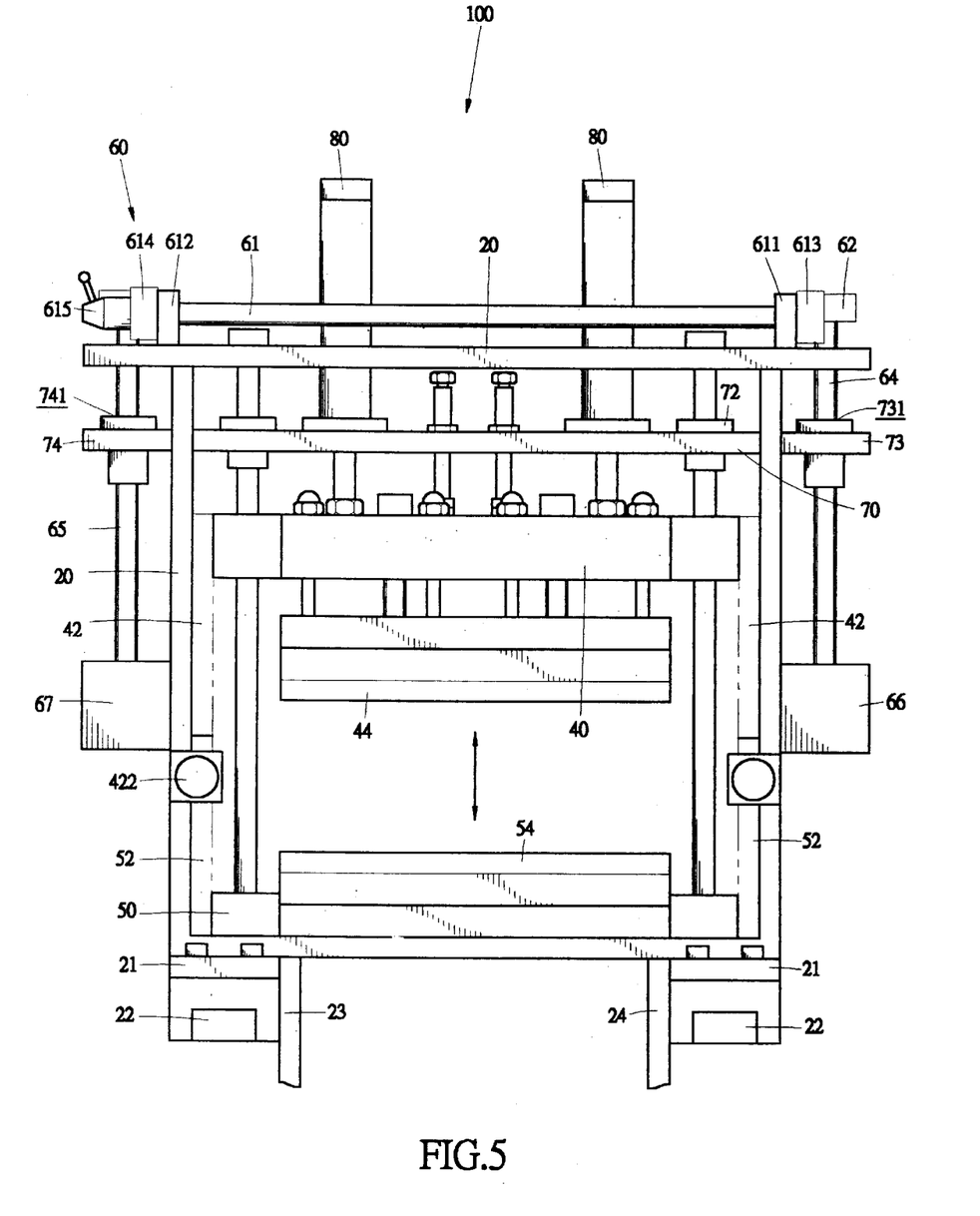
FIG. 5 is a rear view of the end sealing device of the present invention.

Also referring to FIGS. 4 and 5, the upper and lower sealing blocks 40, 50 of the sealing means of the end sealing device 100 are spaced from each other and are guided by posts 41, 51 fixed to and extending from the machine frame 20 to move with respect to each other. Two upper racks 42 are attached to opposite ends of the upper sealing block 40 and extending toward the lower sealing block 50. Similarly, two lower racks 52 are attached to opposite ends of the lower sealing blocks 50 and extending toward the upper sealing blocks 40. Each upper rack 42 opposes the corresponding lower rack 52 with a toothed wheel 43, 53 interposed therebetween and matingly engaging the racks 42, 52 for mechanically coupling the sealing blocks 40, 50 together whereby when the upper sealing block 40 is moved toward/away from the lower sealing block 50, the lower sealing block 50 is simultaneously driven to move toward/away from the upper sealing block 40 due to the engagement between the racks 42, 52 and the toothed wheels 43, 53.

The upper racks 42 are pivotally fixed to the upper sealing block 40 thereby allowing the upper racks 42 to selectively disengage from the toothed wheels 43, 53. A biasing element 421, such as a compressed spring, is arranged to bias and thus causing the upper racks 42 to separate from the toothed wheels 43, 53. An actuation device 422, such as a solenoid or a pneumatic cylinder, has an output rod 422' engaging and forcing each upper rack 42, against the compressed spring 421, to maintain engagement with the corresponding toothed wheel 42, 43. The output rods 422' of the actuation devices 422 are selectively movable to a retracted position where the output rods 422' no longer forces the upper racks 42 to engage the toothed wheels 43, 53 whereby the upper racks 42, under the action of the compressed springs 421, are separated from the toothed wheels 43, 53, disconnecting the upper sealing block 40 from the lower sealing block 50. Thus, the upper sealing block 40 is allowed to freely move toward or away from the lower sealing block 50 without causing the lower sealing block 50 to move simultaneously therewith. This is for adjustment of the distance between the upper and lower sealing blocks 40, 50.

Each sealing block 40, 50 comprises a sealing member 44, 54 which in the embodiment illustrated is a heat-sealing blade that is in general known in the art. The sealing blades 44, 54 can be heated and brought to engage and thus fusing and sealing the package film D.

An adjustment device 60 is attached to the machine frame 20. A bar 61 is rotatably supported by lugs 611, 612 on the adjustment device 60. Two pinions 613, 614 are mounted to ends of the bar 61 for matingly engaging gears 62, 63. Preferably, the pinions and gears 62, 63 are bevel gears or alternatively, each pinion-gear pair (613, 62) (614, 63) can be replaced by a worm-gear pair. A hand wheel 615 is provided on the bar 61 for manual operation of the bar 61. A projection 66, 67 is formed on the machine frame 20 respectively opposing the gears 62, 63 for rotatably supporting lower ends of screw rods 64, 65. Upper ends of the screw rods 64, 65 are co-axially fixed to the gears 62, 63 whereby manual operation of the bar 61 causes rotation of the screw rods 64, 65. In the embodiment illustrated, the projections 66, 67 are respectively fixed to the upper plates of the machine frame 20 at a location below the slots 26 thereby allocating the screw rods 64, 65 on opposite sides of the machine frame 20.

The posts 41, 51 that extend from the machine frame 20 have ends fixed to the adjustment device 60 for fixedly supporting the adjustment device 60 on the machine frame 20.

A movable platform 70 is located above the upper sealing block 40 and below the adjustment device 60. The movable platform 70 comprises connection members 71, 72 for movably coupling the movable platform 70 to the posts 41, 51. Two end portions 73, 74 of the movable platform 70 are movably received in the slots 26 of the upper plates of the machine frame 20. Each end portion 73, 74 defines an inner-threaded hole 731, 741 for matingly engaging the screw rods 64, 65 of the adjustment device 60 whereby when the bar 61 of the adjustment device 60 is manually rotated, the movable platform 70 is moved along the posts 41, 51 with respect to the lower sealing block 50 and the machine frame 20.

A pair of driving units 80, each comprising for example, a solenoid or a pneumatic cylinder, is attached to the movable platform 70. Each driving unit 80 has an extendable rod 81 attached to the upper sealing block 40 whereby when the extendable rod 81 is fixed with respect to the driving unit 80, the upper sealing block 40 is movable with the platform 70 for changing the distance between the upper and lower sealing blocks 40, 50. In addition, the extendable rod 81 is movable by the driving unit 80 between a retracted, non-working position where the upper sealing block 40 is separated from the lower sealing block 50 and an extended, working position where the sealing blades 44, 54 of the sealing blocks 40, 50 engage each other.

In changing the distance between the upper and lower sealing blocks 40, 50, the actuation devices 422 are operated to retract the output rods 422' of the actuation devices 422 thereby allowing the upper racks 42 to disengage from the toothed wheels 43. The adjustment device 60, with the driving units 80 secured, is then operated to drive the platform 70 and the upper sealing block 40 toward/away from the lower sealing block 50 via the screw rods 64, 65. After the adjustment is done, the upper racks 42 are moved back to engage the toothed wheels 43. The initial engagement position between the upper racks 42 and the toothed wheels 43 is thus changed, causing the stroke of the upper and lower sealing blocks 40, 50 to be changed accordingly.

A pair of sensors 90 is arranged on opposite sides of the machine frame 20 for detecting the approach of the article C carried by the conveyor belt 10 toward the end sealing device 100. The detection of the article C initiates the operation of the end sealing device 100, activating the driving units 80 to drive the upper sealing block 40, and thus the lower sealing block 50 mechanically coupled to the upper sealing block 40, to move toward each other for performing heat sealing operation on the package film D enclosing the article C on leading and tailing ends of the article C.

The sensors 90 may be any known sensing devices, such as infrared sensor and electro-optical sensor, but not limited thereto.

In accordance with a preferred embodiment of the present invention, the operation of the end sealing device 100 is controlled by a micro-processor based controlling device (not shown), such as a personal computer, a programmable control unit or the like. Either software or hardware based controlling means can be employed in the present invention. This is, however, well known and constitutes no novel part of the present invention. Thus, no further detail will be given herein.

Figure 6:
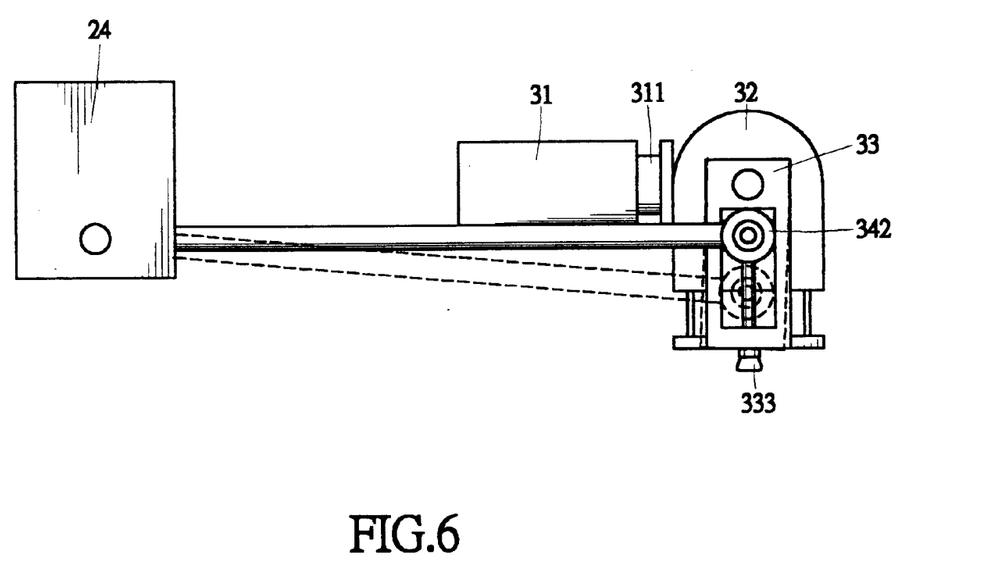
FIG. 6 is a side elevational view showing adjustment of stroke of a machine frame driven by the driving system of FIG. 3.

In practice, the end sealing device 100 of the present invention may be integrated with a packaging system for automatic mass production. By changing the eccentricity between the shaft 344 of the eccentric member 33 and the output shaft 321 of the speed reduction device 32 (as shown in FIG. 6), the stroke of the machine frame 20 or in other words, the moving distance of the machine frame 20, can be adjusted to accommodate the end sealing device 100 to articles C of different sizes and different moving speeds of the article C along the conveyor belt 10. When the machine frame 20 is moved by the driving system 30 with respect to the conveyor belt 10, the shape and size of the chamber 13 is maintained, as can be seen by comparing FIGS. 2 and 7, whereby the operation of the end sealing device 100 is not affected by changing the relative position of the end sealing device 100 with respect to the conveyor belt 10. The sealing blocks 40, 50 may selectively approach leading and tailing ends of the article C to be packaged by being driven by the driving system 30 to perform heat sealing operation at the leading and tailing ends of the article C with the sealing blades 44, 54 fusing and sealing the package film D.

Figure 8:
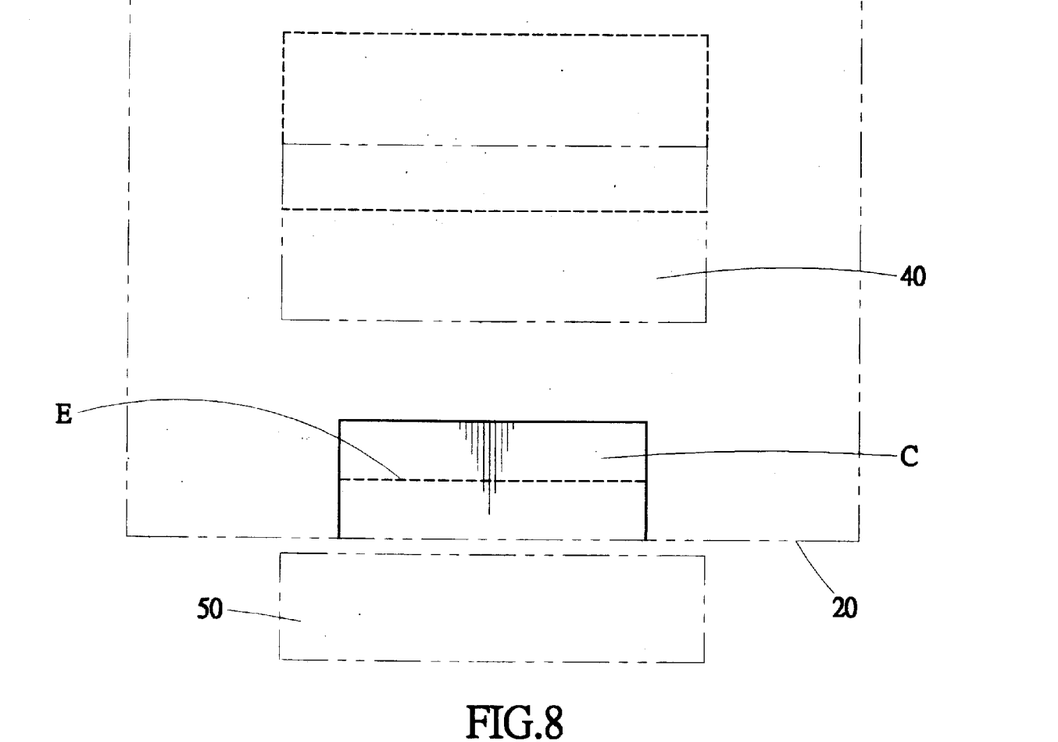
FIG. 8 is a schematic rear view showing the end sealing device of the present invention performing sealing operation on an article having a large thickness.
Figure 9:
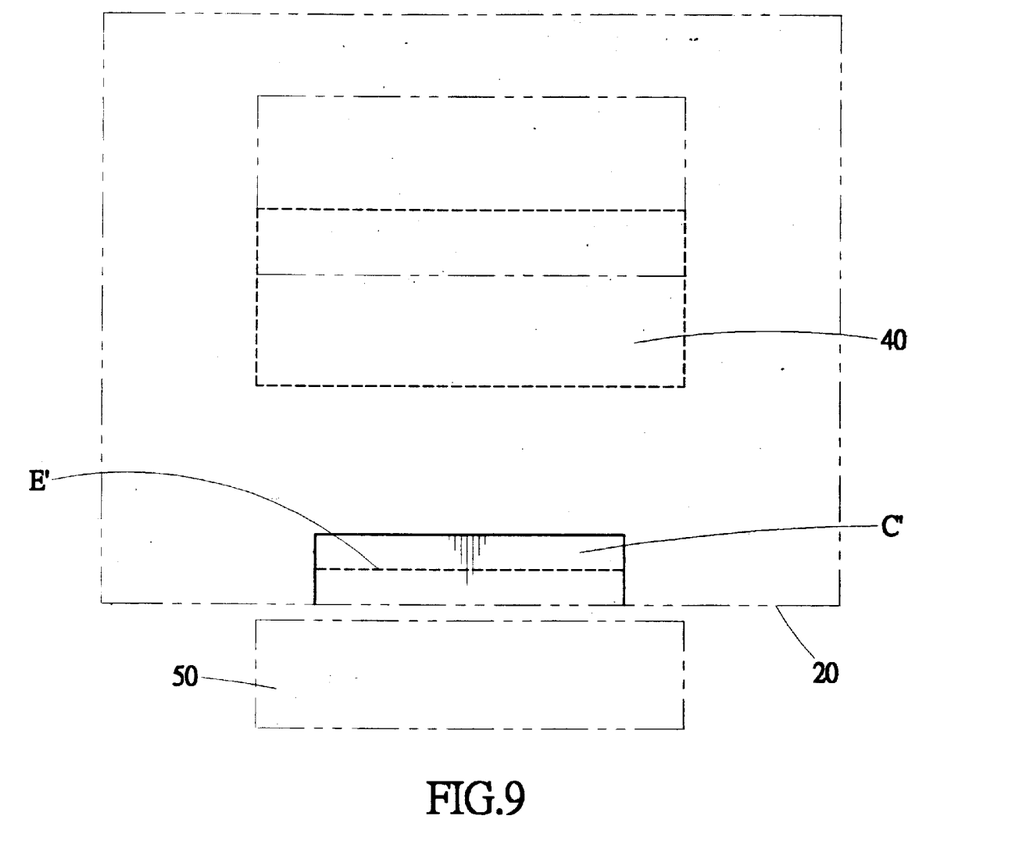
FIG. 9 is a schematic rear view showing the end sealing device of the present invention performing sealing operation on an article having a small thickness.

FIGS. 8 and 9 show the operation of the end sealing device 100 of the present invention in packaging articles of different thickness, respectively designated with reference characters C and C'. The article C shown in FIG. 8 has a large thickness which causes a sealing line below a middle line substantially bisecting the thickness of the article C if a conventional sealing device is employed. Such a problem can be cured in the present invention by operating the adjustment device 60 to change the initial distance between the upper and lower sealing blocks 40, 50 whereby the sealing blades 44, 54 of the sealing blocks 40, 50 meet each other at a location substantially corresponding to the middle line and thus forming a sealing line E corresponding to the middle line.

In the case of FIG. 9, the thickness of the article C' is small. Thus, the distance between the upper and lower sealing blocks 40, 50 is reduced by operating the adjustment device 60. Eventually, a sealing line E' corresponding to the middle line of the thickness of the article C' can be formed.

Although the present invention has been described with reference to the preferred embodiment thereof, it is apparent to those skilled in the art that a variety of modifications and changes may be made without departing from the scope of the present invention which is intended to be defined by the appended claims. For example, the electrical motor based driving system 30 can be replaced by an equivalent system, such as a hydraulic or pneumatic base system. The hand wheel 615 may be replaced by for example an electrical motor or the like. The movement of the platform 70 and the upper sealing block 40 can be achieved by other known elevating lowering means. Furthermore, the platform 70 and the upper sealing block 40 can be integrated with each other to form a unitary member.

What is claimed is:

1. A packaging system comprising:

a conveyor belt having a carrying surface adapted to support and carry an article in a forward direction, the conveyor belt being rotatably supported by rollers whereby a recessed chamber is formed on the carrying surface of the belt; and an end sealing device comprising:

a machine frame movably supported on rails to be reciprocatingly movable with a stroke;

a driving system comprising a motor coupled to a speed reduction device, an eccentric member being eccentrically mounted to an output shaft of the speed reduction device, the eccentric member having a shaft movably mounted thereto for adjustment of an eccentricity of the shaft with respect to the output shaft, a link having a first end rotatably attached to the shaft of the eccentric member and a second end connected to the machine frame for selectively driving the machine frame between a first and second positions;

upper and lower sealing blocks movably supported in the machine frame by posts for guiding the movement thereof with respect to each other, the lower sealing block being accommodated in the recessed chamber of the conveyor belt and the upper sealing block being located above the conveyor belt and spaced from the lower sealing block to allow the article to pass therebetween, at least an upper rack movably attached to and extending from the upper sealing block, a lower rack fixedly attached to and extending from the lower sealing blocks and corresponding the upper rack with a toothed wheel matingly interposed therebetween so as to mechanically couple the upper and lower sealing blocks together, the sealing blocks forming sealing blades opposing each other adapted to perform a sealing operation on a package film enclosing the article;

an actuation device for selectively disengaging the upper rack from the toothed wheel;

a platform movably supported in the machine frame by the posts, at least one driving unit mounted to the platform, the driving unit having a driving rod attached to the upper sealing block for selectively moving the upper sealing block with respect to the lower sealing block to bring the sealing blades of the sealing blocks to engage each other; and an adjustment device fixedly mounted to the machine frame, comprising:

at least a screw rod threadingly engaging an inner-threaded hole defined in the platform, and an input bar having an operation device mounted thereto being mechanically coupled to the screw rod for rotating the screw rod to drive the platform and the upper sealing block to move along the posts;

wherein the recessed chamber is maintained during the movement of the machine frame with respect to the conveyor belt by being driven by the driving system, the upper and lower sealing blocks of the end sealing device being selectively brought to positions corresponding to ends of the article for performing sealing operation on a package film enclosing the article, and wherein the spacing between the upper and lower sealing blocks is adjustable by moving the upper sealing block with respect to the lower sealing block by means of the adjustment device with the upper rack temporarily disengaged from the toothed wheel.

2. The packaging system as claimed in claim 1, wherein the recessed chamber is formed by surrounding the conveyor belt through rollers that are attached to the machine frame.

3. The packaging system as claimed in claim 1, wherein the conveyor belt is driven by a motor.

4. The packaging system as claimed in claim 1, wherein the end sealing device comprises at least a sensing device for detecting the article.

5. The packaging system as claimed in claim 4, wherein the sensing device comprises an infrared sensor.

6. The packaging system as claimed in claim 4, wherein the sensing device comprises an electro-optic sensor.

7. The packaging system as claimed in claim 1, wherein the machine comprises slide blocks movably supported on the rails.

8. The packaging system as claimed in claim 1, wherein the eccentric member of the driving system defines a slot radially extending with respect to the output shaft of the speed reduction device with a block movably received therein, the shaft of the eccentric member extending from the block, a screw rod threadingly engaging the block for moving the block in the slot to adjust the eccentricity of the shaft of the eccentric member with respect to the output shaft of the speed reduction device.

9. The packaging system as claimed in claim 8, wherein the link forms a ring on the first end thereof for being rotatably fit over the shaft of the eccentric member.

10. The packaging system as claimed in claim 8, wherein the screw rod forms an operation element on an end thereof.

11. The packaging system as claimed in claim 1, wherein the machine frame comprises two lower plates spaced from each other with a cross bar attached to and extending between the lower plates, a ring formed on the second end of the link for being rotatably fit over the cross bar to connect the machine frame to the driving system.

12. The packaging machine as claimed in claim 1, wherein the driving system comprises cushioning means associated with the link.

13. The packaging system as claimed in claim 1, wherein the upper rack is pivotally attached to the upper sealing block and is biased to disengage from the toothed wheel by a biasing member, the actuation device being operated to force the upper rack to engage with the toothed wheel against the biasing member.

14. The packaging system as claimed in claim 13, wherein the actuation device comprises a solenoid.

15. The packaging system as claimed in claim 13, wherein the actuation device comprises a pneumatic cylinder.

16. The packaging system as claimed in claim 1, wherein the platform comprises connection members for movably coupling the platform to the posts.

17. The packaging system as claimed in claim 1, wherein the driving unit of the platform comprises a solenoid.

18. The packaging system as claimed in claim 1, wherein the driving unit of the platform comprises a pneumatic cylinder.

19. The packaging system as claimed in claim 1, wherein the bar of the adjustment device is rotatably supported by lugs on the machine frame.

20. The packaging system as claimed in claim 1, wherein the adjustment device comprises a hand wheel mounted to an end of the bar for manually driving the bar.

* * * * *